April 9, 1935. H. P. BIRKEMEIER 1,997,448
AUTOMATIC VACUUM GEAR SHIFT
Original Filed May 2, 1932  5 Sheets-Sheet 2
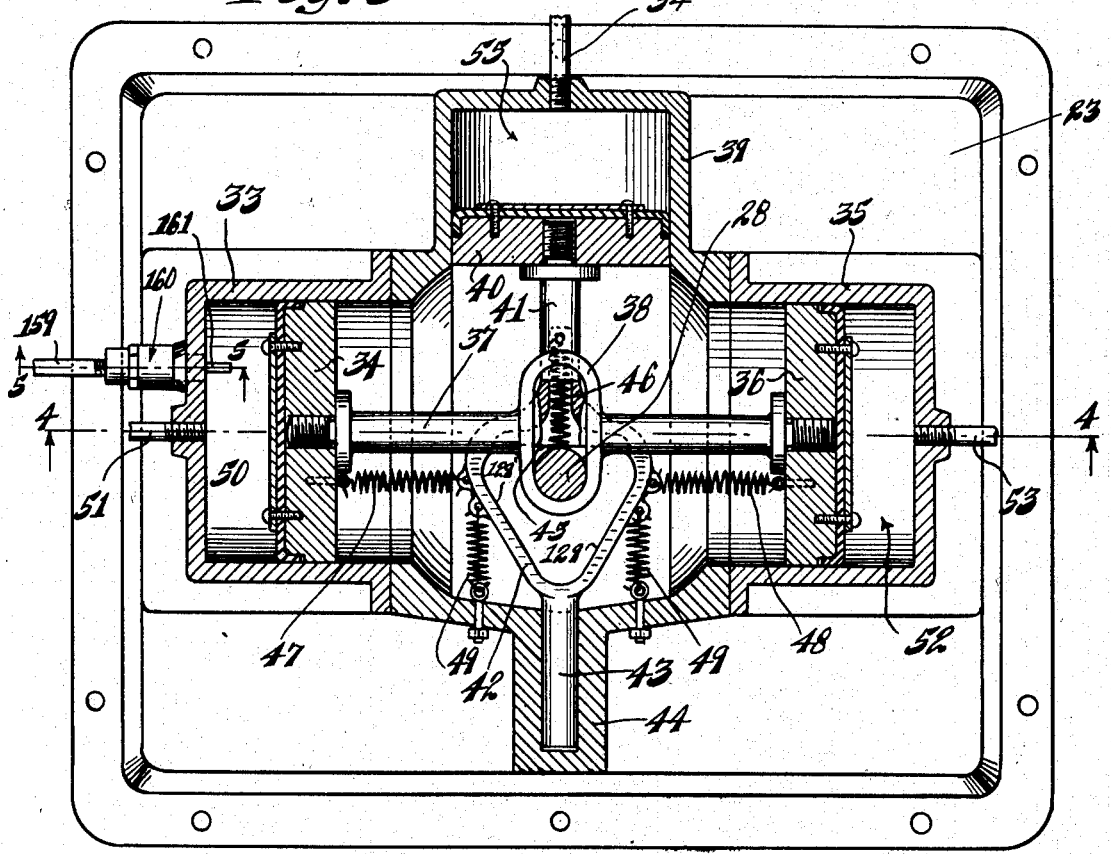
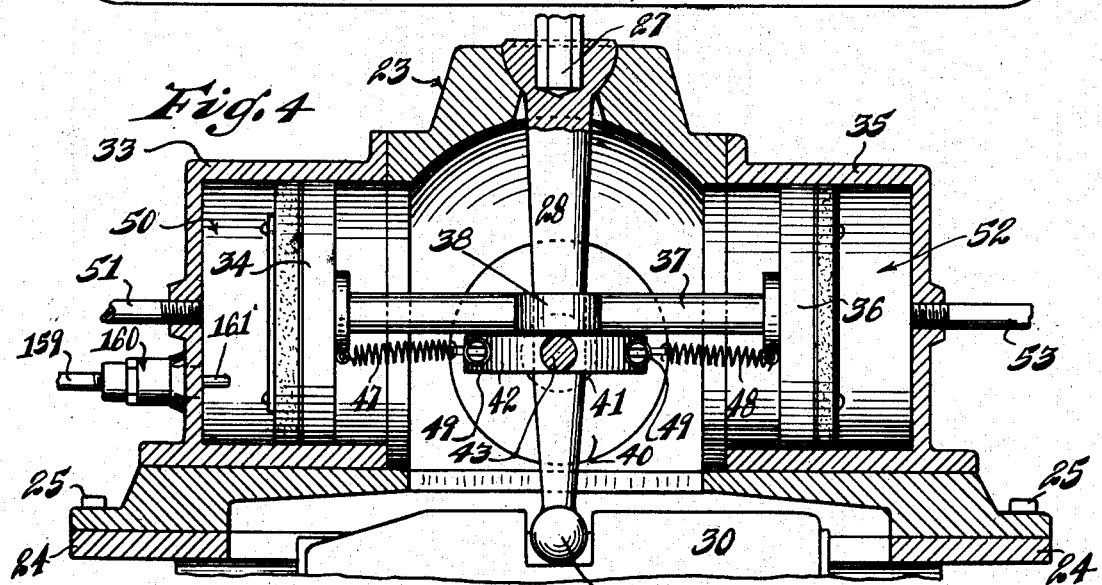
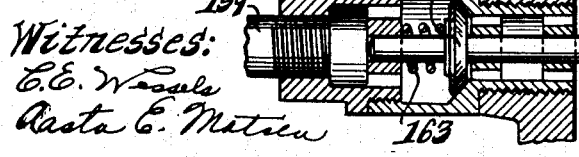
Inventor:
Henry P. Birkemeier,
By Joshua R. H. Potts
his Attorney.

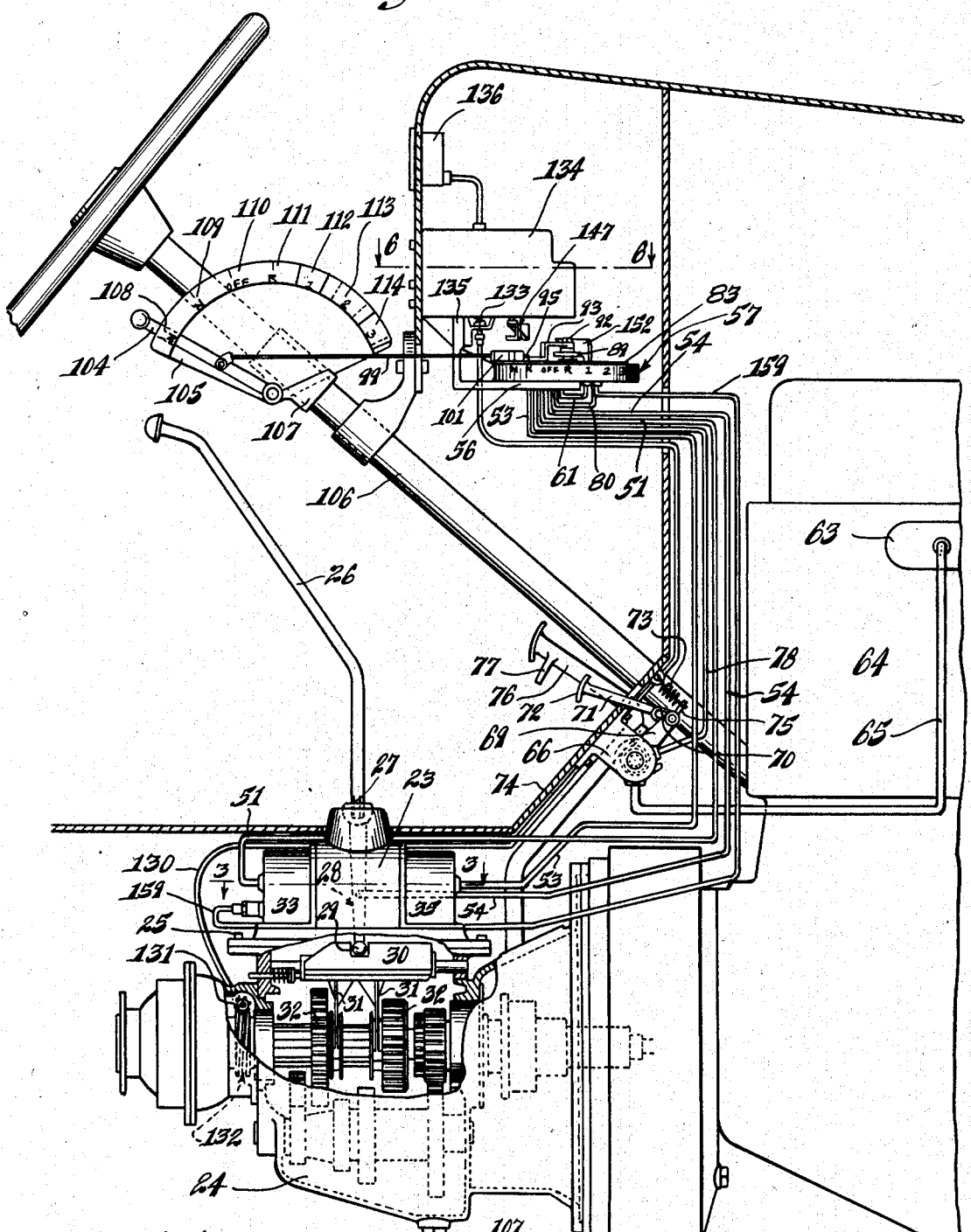

April 9, 1935.   H. P. BIRKEMEIER   1,997,448
AUTOMATIC VACUUM GEAR SHIFT
Original Filed May 2, 1932   5 Sheets-Sheet 3
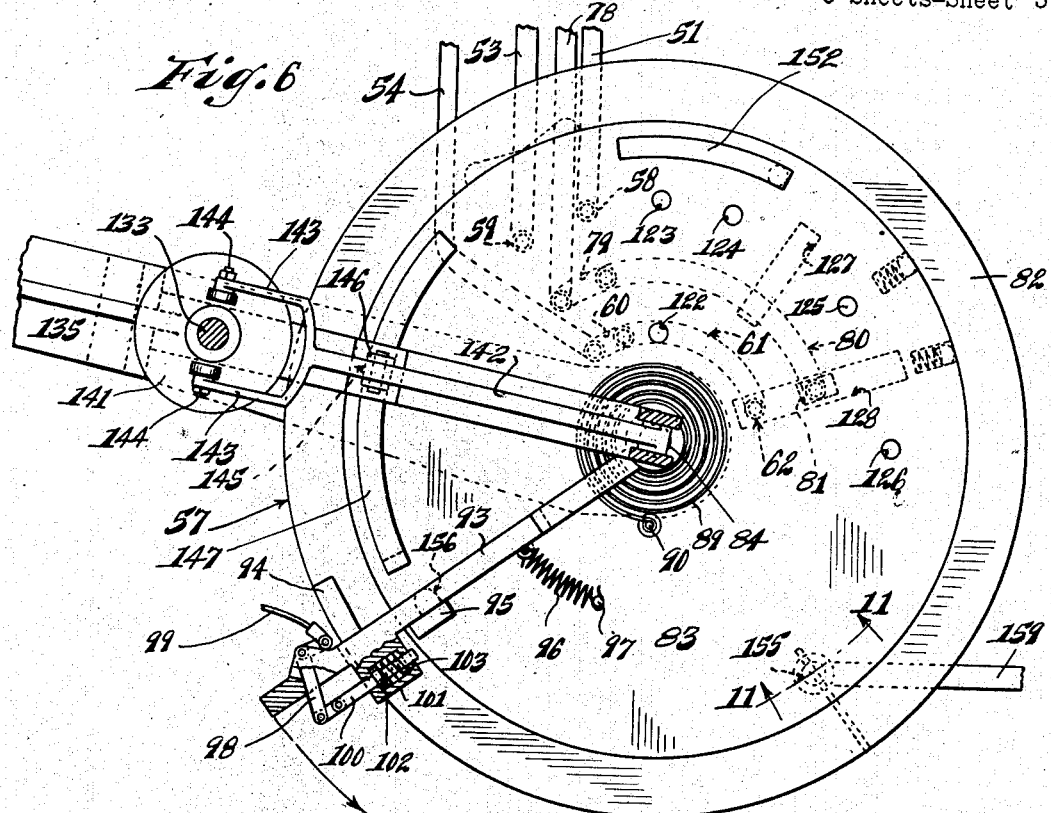
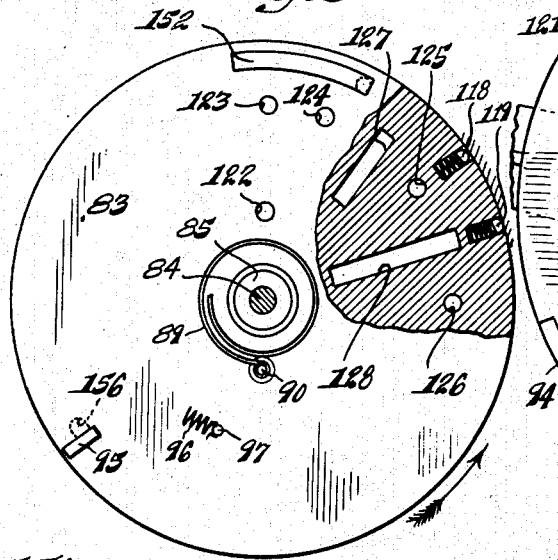
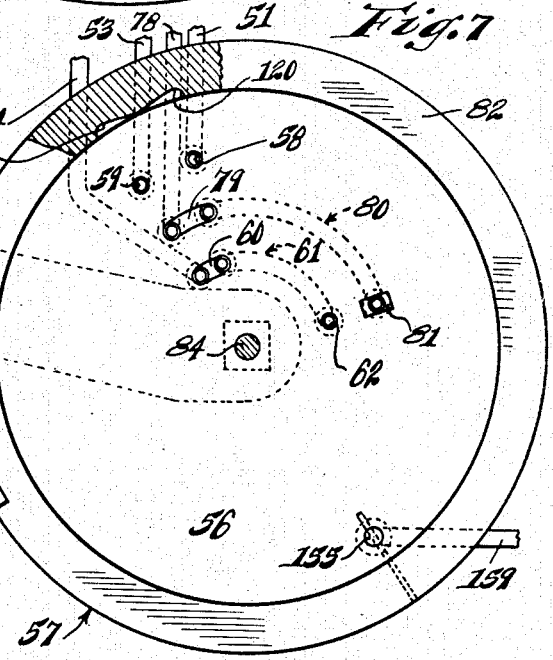
Witnesses:
C. E. Wessels
Rasta E. Matsen
Inventor:
Henry P. Birkemeier;
By Joshua R. H. Potts
his Attorney.

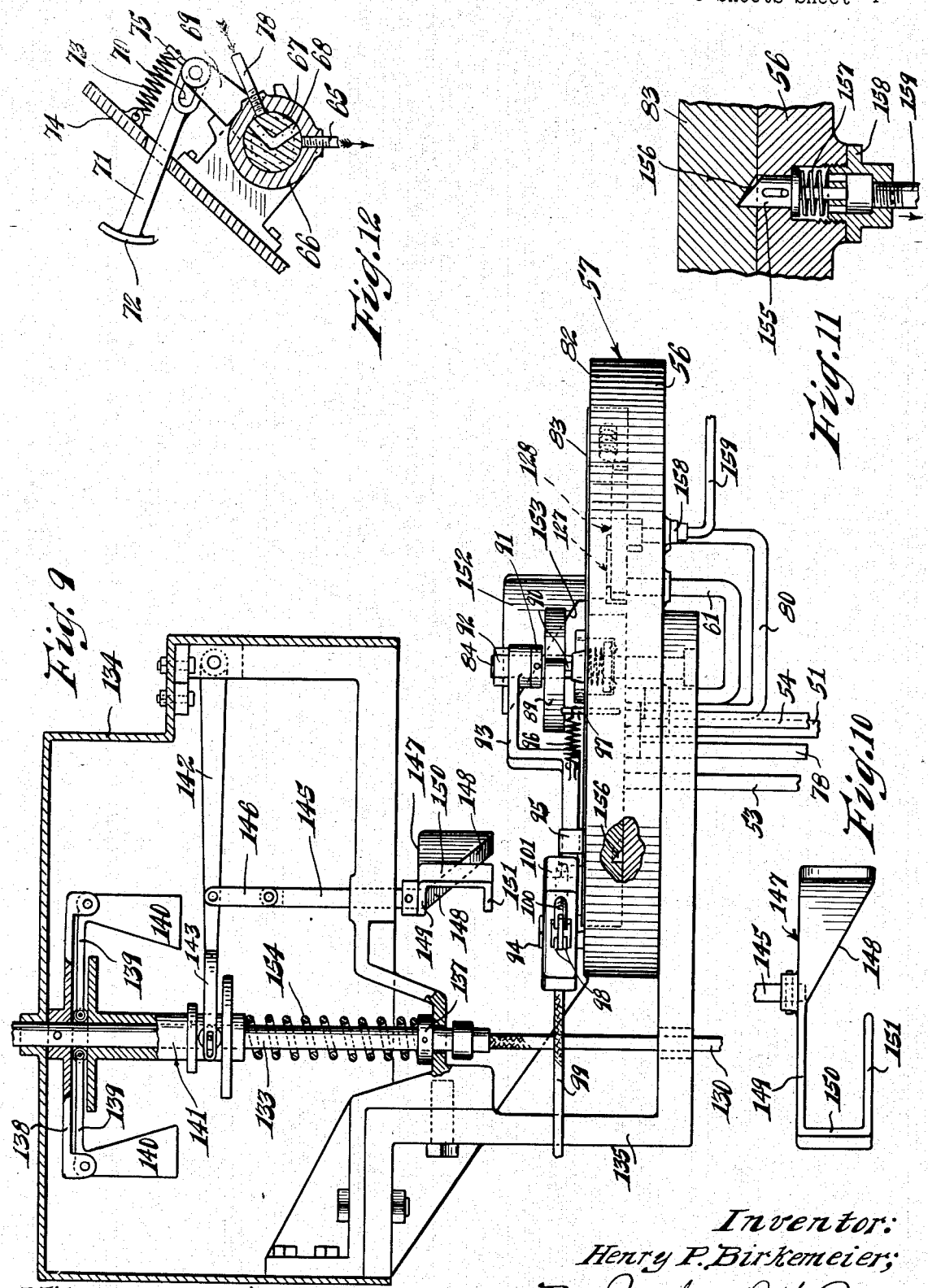

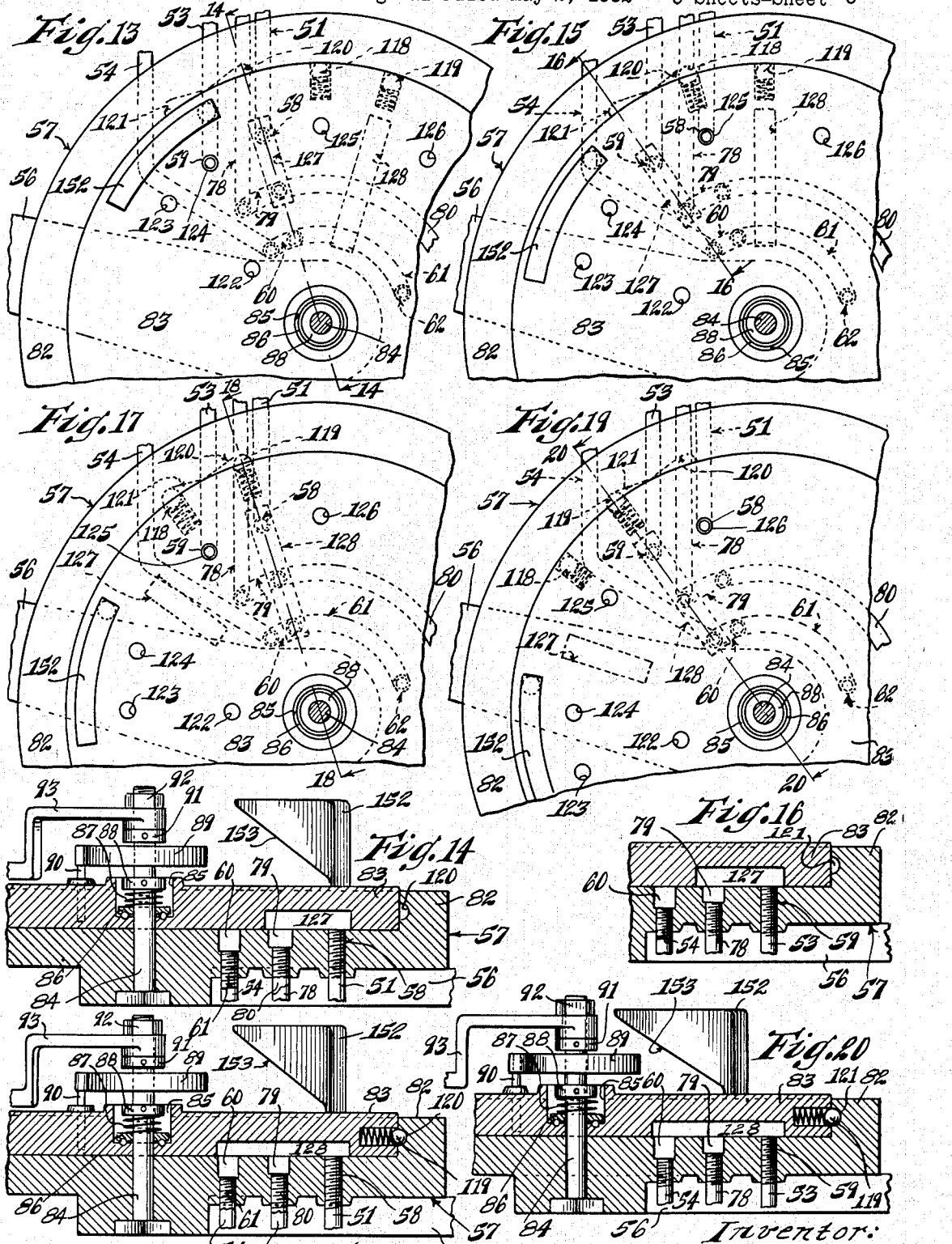

Patented Apr. 9, 1935

1,997,448

UNITED STATES PATENT OFFICE 1,997,448

AUTOMATIC VACUUM GEAR SHIFT

Henry P. Birkemeier, Chicago, Ill.

Application May 2, 1932, Serial No. 608,708
Renewed January 14, 1935

7 Claims. (Cl. 74—334)

This invention relates to an automatic vacuum gear shift specially designed and adapted for use in connection with a motor vehicle employing an internal combustion engine provided with an air intake manifold. An object of the invention is the provision of mechanism utilizing the air suction or partial vacuum possible of creation by means of a connection to the air intake manifold for the purpose of effectuating the shifting of the gears for the different speeds and for the reverse position. A further object of the invention is the provision of improved means in the form of a conveniently mounted control lever adapted to operate a valve provided with a plurality of ports and air passageways connected to cylinders within which are slidably mounted pistons having connecting rods operatively associated with the lower portion of the usual gear shift lever whereby to actuate the latter by means of air suction or the partial vacuum described. An additional object is the inclusion of novel mechanism operatively associated with the driving mechanism of the motor vehicle in such manner as to automatically effect shifting of the gears in accordance with different rates of speed as predetermined, which automatic operation is completed by mere depression of the clutch pedal.

Other objects will appear hereinafter.

The invention consists in the combinations and arrangements of parts hereinafter described and claimed.

The invention will be best understood by reference to the accompanying drawings, forming a part of this specification, and in which:

Fig. 1 is a general side elevational view of the mechanism or apparatus operatively connected to the gear shifting mechanism of a motor vehicle, and illustrating the intake manifold connection, the clutch pedal and clutch air valve, as well as the control valve with the control lever, the various piping or tubular connections, and the mechanical connection for the automatic operation;

Fig. 2 is a detail view showing the bracket provided with notches for positioning the control lever at different selected positions, and the collar for connection to the steering column;

Fig. 3 is an enlarged horizontal sectional view of the piston actuating mechanism, taken substantially on the line 3—3 of Fig. 1;

Fig. 4 is a vertical sectional view, taken substantially on the line 4—4 of Fig. 3;

Fig. 5 is a detail sectional view of the detent control valve mounted in the left cylinder shown in Figs. 3 and 4 and brought into operation in automatically shifting from first speed to second speed;

Fig. 6 is an enlarged horizontal sectional view of the automatic mechanism and the main control valve, taken substantially on the line 6—6 of Fig. 1, and illustrating the control valve in the first neutral position;

Fig. 7 is a plan view of the stationary base portion of the main control valve;

Fig. 8 is a plan view, partially broken away, showing the rotatably mounted disc portion of the main control valve;

Fig. 9 is an enlarged vertical sectional view of the main control valve and the tubular connections, together with the mechanism for effectuating the automatic shifting of the gears;

Fig. 10 is a detail view of the vertically movable cam member operatively connected to the automatic mechanism;

Fig. 11 is a detail vertical sectional view, taken substantially on the line 11—11 of Fig. 6, showing the detent valve in engaged position when the rotatably mounted disc has been rotated in a counter-clockwise direction from the position shown in Fig. 6 to bring the detaining notch of the disc in registry with the detent tooth;

Fig. 12 is a detail view of the clutch control valve for controlling the passage of air between the main control valve and the intake manifold of the engine and adapted to be operatively associated with the clutch foot pedal;

Fig. 13 is a partial view of the main control valve, showing the registry of the various air ports when the rotatably mounted disc portion has been moved to the reverse position, or the position to cause the gears to be shifted so as to reverse the direction of the vehicle when the clutch is brought into engagement;

Fig. 14 is a vertical sectional view, taken substantially on the line 14—14 of Fig. 13;

Fig. 15 is a view, similar to Fig. 13, showing the main control valve in position to shift the gears for first speed, as hereinafter more particularly described;

Fig. 16 is a vertical sectional view, taken substantially on the line 16—16 of Fig. 15;

Fig. 17 is a view similar to Fig. 15, showing the position of the main control valve for shifting the gears into second speed;

Fig. 18 is a vertical sectional view, taken substantially on the line 18—18 of Fig. 17;

Fig. 19 is a view, similar to Figs. 15 and 17, but showing the position of the main control valve when in position to shift the gears into third or high speed. In the illustrative embodiment of the invention disclosed three forward speeds and one reverse are employed, but it will be understood that modifications may be adopted within the scope and spirit of the invention.

Fig. 20 is a vertical sectional view, taken substantially on the line 20—20 of Fig. 19.

The preferred embodiment of the invention is shown operatively connected to a motor vehicle, and by particular reference to Fig. 1 a specially designed cylinder housing 23 is adapted to replace the usual transmission case cover and be connected to the transmission case or housing 24 by means of bolts 25 positioned accordingly to the bolts usually adapted to secure the transmission case cover. The manually operable gear shift lever 26 is provided with a polygonal extremity 27, as shown in Fig. 4, for removable insertion in a polygonal socket provided in the lower gear shift lever 28. In the present description the lower portion of the lever 28 will be designated as the gear shift lever to facilitate description, and it will be understood that the construction is the same as that usually employed except that the upper gear shift lever 26 is removable and rendered dispensable in the present invention except in cases of emergency. Also, as shown in Fig. 4, the lower ball extremity 29 of the gear shift lever 28 is operatively associated with the usual gear shifting fork plate 30 carrying shifting forks 31 for shifting the driving gears 32 into the various positions for different speeds forward and for reverse. It will be understood that this construction is standard, and it is therefore unnecessary to explain the mechanism in detail.

The cylinder and piston mechanism illustrated in Figs. 3 and 4 and adapted to be superposed upon the gear shift housing, comprise a rear cylinder 33 which, for convenient reference in description will be designated herein as cylinder No. 1, and within which is slidably mounted piston 34. Cylinder 35, disposed longitudinally forward of cylinder 33, may be designated herein as cylinder No. 2 for convenience, and has slidably mounted therein piston 36. As clearly illustrated in Figs. 3 and 4, pistons 34 and 36 are rigidly connected by connecting rod 37 having an intermediate slotted portion 38 to allow for transverse or crosswise movement or shifting of the lever 28. The slotted portion 38 also serves to engage the gear shift lever 28 for shifting the latter forwardly and rearwardly. The assembly described also includes a cross shift cylinder 39 within which is slidably mounted piston 40, to which is connected a rod member 41. As illustrated in Fig. 3, rod 41 carries a triangular shaped cross shifting member 42 provided with a rod 43 slidably mounted in guide 44.

The shifting lever 28 is normally maintained against the surface 45 of member 42 by means of tension spring 46 which rides in a groove in the member 42 to permit of relative longitudinal movement of lever 28, but which is adapted to urge or maintain the latter in continuous contact with the surface 45. It will be noted that the pistons 34 and 36, together with the connecting rod 37, are adapted to travel in a perpendicularly opposite direction from the travel of piston 40 and connecting rod 41 and member 42, and for the purpose of normally maintaining or bringing pistons 34 or 36 to the neutral position shown in Figs. 3 and 4, there are provided a pair of equalizing tension springs 47 and 48, connected respectively to the pistons 34 and 36, and to the triangular cross shift member 42. The cross shifting member 42 and the cooperating gear shift lever 28 is normally maintained toward the right, or in a downward position when viewed as in Fig. 3, by means of a pair of tension springs 49 connecting the member 42 and the housing 23.

In accordance with the standard gear shift construction, when lever 28 is in the position shown in Figs. 3 and 4, and piston 34 is moved toward the left, the gears are shifted to reverse the vehicle. When lever 28 is in the same position and piston 36 is moved toward the right the gears are in position to drive the vehicle in first speed forward. In order to cause shifting of the gears into second speed forward, cross piston 40 is moved upwardly from the position shown in Fig. 3, or toward the left in normal operation, and piston 34 in No. 1 cylinder, or cylinder 33, is moved rearwardly or toward the left by reference to Figs. 3 and 4. Correspondingly, when the cross piston 40 is in the same shifted position and piston 36 is moved toward the right in cylinder No. 2, or cylinder 35, the driving gears are shifted into third speed forward.

Piston 34 in cylinder No. 1, or cylinder 33, is adapted to be drawn toward the left for the purpose described by means of a partial vacuum created in chamber 50 through an air suction control connected to the air intake manifold of the engine, later more particularly described, and for this purpose cylinder 33 has connected thereto an air pipe 51. For the same purpose, and to create a partial vacuum in chamber 52 of cylinder No. 2, or cylinder 35, the latter has connected thereto an air pipe or tube 53. Also, cross shift cylinder 39 has connected thereto air pipe 54 for creating a partial vacuum and consequent air suction in chamber 55 to cause movement of piston 40 upwardly, as from the position shown in Fig. 3, or toward the left in usual practical operation.

Pipe 51 of No. 1 cylinder, or cylinder 33, is connected to the base of stationary plate 56 or the main control valve 57 and terminates in a circular air port 58, as clearly shown in Fig. 7. Following the connections of the several other pipes between the cylinders and the plate 56, pipe 53 of cylinder No. 2, or cylinder 35, is connected to the base of plate 56 to terminate in a circular air port 59. Pipe 54 of cross shift cylinder 39 is connected to plate 56 to terminate in one end of a grooved port 60, the opposite end of which is connected to a relatively short arcuate pipe 61, more clearly shown in Fig. 9, which is mounted beneath the plate 56, and the opposite end of which pipe terminates in an air port 62, offering communication upon the upper surface of plate 56.

Connected to the air intake manifold 63 of the engine 64 is an air suction pipe 65 which leads to a clutch air valve 66 provided with a rotary core 67 having an angular air passageway 68 (see Figs. 1 and 12). Core 67 is connected to operating arm 69, the end of which carries a pin adapted to be engaged in slotted portion 70 of operating rod 71 carrying enlarged head 72. The arm 69 and associated parts are normally maintained in the position shown in Fig. 12 by means of a tension spring 73 connected to the floor board 74 and to an extension 75 provided on the arm 69.

By reference to Fig. 1, it will be seen that when the clutch pedal 76 is initially depressed no contact with rod 71 is obtained, but during the latter part of the downward travel a laterally extending projection 77 contacts with head 72, causing rotation of core 67 in a clockwise direction from the position shown in Fig. 12, and consequently opening communication between pipe 65 through air passageway 68 to pipe 78 which leads to one end of an arcuate grooved port 79 on the upper surface of plate 56, as shown in Fig. 7. The opposite end of grooved port 79 is connected to a relatively long connecting pipe 80 disposed beneath plate 56, as shown in Fig. 9, and the opposite end of which terminates in a rectangular air port 81 upon the upper surface of plate 56 (see Fig. 7). Thus it will be understood that normally communication is closed between pipe 65 and pipe 78, but that this communication is opened by depression of the clutch pedal 76 and the consequent depression of the valve control rod 71. The slotted portion 70 of rod 71 is provided for the purpose of accommodating different adjustments of the clutch pedal 76.

The periphery of the plate 56 is preferably provided with a circular upwardly extending flange 82 for the retention of a rotatably mounted disc 83, shown in Fig. 8, which is loosely mounted upon a vertically extending shaft 84 secured to the base plate, as shown in Figs. 14 and 18. Disc 83 is preferably provided with a central opening 85, within which is arranged bearing 86. A small compression spring 87 is interposed between bearing 86 and collar 88 on the shaft 84 for normally maintaining the disc 83 in airtight slidable contact with plate 56. Secured above the collar 88 on shaft 84 is a coil spring 89, the opposite end of which is affixed to pin 90 on disc 83. This is for the purpose of normally urging disc 83 in a clockwise direction from the position shown in Fig. 6. Also loosely mounted upon the stationary shaft 84 between collar 91 and nut 92 is an operating arm 93 adapted normally when in initial or first neutral position, hereinafter more definitely described, to rest against a stop 94 mounted on the flanged portion 82 of plate 56. As shown in Fig. 6, operating arm 93 extends radially from the central shaft 84, and the clockwise movement of disc 83 is limited by a stop 95 mounted upon the disc 83 and adapted to contact with operating arm 93. Referring to Fig. 6, a tension spring 96 is preferably connected to operating arm 93 and to a pin 97 upon disc 83 to assist in rotating disc 83 in a clockwise direction when arm 93 is swung in a corresponding direction, as later described.

Pivotally mounted upon the outer extremity of operating arm 93 is a bell crank 98, as shown in Fig. 6, the short arm of which is connected to a relatively stiff but flexible operating wire 99 which may be encased if desired, and the long arm of which is connected to a jointed rod 100 slidably mounted in a laterally extending boss 101 mounted on the operating arm 93. Rod 100 preferably carries a collar 102 adapted to bear against a small compression spring 103 mounted in an opening in the boss 101 and adapted to urge the rod 100 outwardly to the position shown in Fig. 6. The opposite end of wire 99 is connected to control lever 104 pivotally mounted upon bracket 105, as shown in Fig. 1, which is secured to the steering column 106 by means of a sleeve 107. As shown in Fig. 1, control lever 104 is adapted to be placed or moved forwardly to seven positions, namely, a first neutral position 108, a second neutral position 109, an off position 110, a reverse position 111, a first speed forward position 112, a second speed forward position 113, and a third speed forward position 114.

To obtain greater accuracy in the positioning of lever 104 in the first, second, and third speed positions, bracket 105, as shown in Fig. 2, is provided with a notch 115 for the first speed position, a second notch 116 for the second speed position, and a third notch 117 for the third speed position. By this construction and arrangement, when control lever 104 is shifted forwardly from the position shown in Fig. 1 it serves to push the operating wire 99 and swing arm 93 in a counter-clockwise direction from the position shown in Fig. 6. This also serves to rotate the disc 83 in a counter-clockwise direction for bringing the various ports into registry, as later described. When the control lever 104 is rotated or swung toward the left from any position to which it has been operated, as by reference to Fig. 1, jointed rod 100 is moved inwardly and its extremity engages stop 95 on disc 83, thereby serving to swing the latter in a clockwise direction back to the position shown in Fig. 6, in assistance to said tension spring 96 as well as coil spring 89.

The disc 83 is provided on its periphery with a pair of spring-pressed balls 118 and 119 (see Fig. 3), and when the disc is in the first speed position shown in Fig. 15, ball 118 rests in a pocket 120 of the flange 82 for the purpose of securing more positive positioning. In the second speed position as shown in Fig. 17, ball 118 is engaged in a second pocket 121, and ball 119 then rests in the first pocket 120. In the third speed position shown in Fig. 19, ball 119 rests in pocket 121. It will be noted that pockets 120 and 121 are joined by inclined sides to facilitate passage of the balls 118 and 119, and definite positioning of said disc 83 for the three forward speeds to obtain positive registry of the various ports is thus provided for.

By reference to Figs. 6 and 8, it is seen that disc 83 is provided with five air ports which extend through the disc and thus offer communication to the atmosphere, numbered consecutively 122, 123, 124, 125, and 126. The under surface of disc 83 has a radially extending relatively short groove port 127, and also a relatively longer groove port 128.

When the control valve is in the first neutral position, shown in Fig. 6, the long port 128 offers communication between pipes 61 and 80, also connecting grooved ports 60 and 79 of plate 56, and thus offering communication to pipe 78 connected to the clutch air valve 66. The pipe 54 to the cross shift cylinder is also placed in communication with elongated port 128. This is the normal position at idling speed, and if the clutch pedal is depressed, opening valve 66, only the cross shift piston 40 is operated upon, but the air connections are then closed and there is no passage or leakage of air into the intake manifold.

In the second neutral position, the cross shift cylinder 39 is opened to the atmosphere when the clutch air valve is operated, inasmuch as air port 122 is shifted in communication with the grooved port 60 of plate 56. Also in this position the cylinder 33 is opened to the atmosphere through port 123 brought into communication with port 58 of pipe 51. Elongated port 128 is not opened to ports 62 and 81, and consequently cylinder 35 is not opened to the atmosphere even though the clutch air valve is operated. This position releases the vacuum or air suction in the cross shift cylinder 39, allowing the parts to be brought to the position shown in Fig. 3 by means of the tension springs 49 ready for shifting of the gears into position for reverse or for first speed forward.

In the third or off position 110 of Fig. 1, all of the cylinders 33, 35, and 39 are opened to the atmosphere when the clutch air valve is operated by means of port 122 being brought in communication with port 60, of pipe 54, port 123 being brought into communication with port 59, of pipe 53, and port 124 being brought into communication with port 58 of pipe 51. If the gears are in position for the third speed forward, and it is desired to bring them into neutral position, the disc 83 must be rotated to pass through the off position, which releases the air in the cross shift cylinder 39, allowing the lever 28 to be swung to the position shown in Fig. 3 by means of spring 49.

In the fourth or reverse position 111, shown in Fig. 13, cylinder 35 of Fig. 3 is opened to the atmosphere when the clutch valve is operated by means of port 124 being brought into communication with port 59 of pipe 53. The cross shift cylinder 39 is not opened to the atmosphere in this position, but the piston 40 is pulled to the position shown in Fig. 3 by means of the springs 49. No 1 cylinder, or cylinder 33, in this position is placed in communication with the intake manifold 63 through pipe 65 and the connected pipes, by reason of the fact that port 58 of pipe 51 is in communication with groove port 127, which is also in communication with groove port 79 and consequently pipe 78 leading to the clutch valve 66. Thus when the clutch valve 66 is operated, the gears are shifted into reverse position and remain in this position when the clutch valve is released, allowing the operator to depress the accelerator and reverse the automobile. A similar operation occurs in all of the following different positions except for the automatic operation later described.

In the first speed position 112, as shown in Fig. 15, the cross shift cylinder 39 is not opened to the atmosphere, as shown in Fig. 13, but cylinder 35 is placed in communication with the intake manifold by reason of the registry of ports 59, 79, and 127, and pipe 78, but in this position cylinder 33, or No. 1 cylinder, is opened to the atmosphere by reason of the registry of ports 125 and 58.

In the second speed position 113, shown in Fig. 17, port 125 is placed in communication with port 59 of pipe 53, placing cylinder 35 open to the atmosphere. No. 1 cylinder, or cylinder 33, is placed in communication with the intake manifold by reason of the registry of ports 79 and 128, and port 60 of the cross shift cylinder 39, by communication through pipe 54. Thus it will be understood that in this position both cylinders 33 and 39 are placed in communication with the intake manifold when the clutch air valve is operated.

In the final position, for third speed forward, as shown in Fig. 19, the cylinder 35 and the cross shift cylinder 39 are placed in communication with the intake manifold by reason of the registry of ports 59, 60, 79, and 128, and in this position the cylinder 33 is opened to the atmosphere by reason of the registry of ports 58 and 126.

By reference to Fig. 3, when the gears are shifted from first speed to second speed forward, surface 129 of the triangular member 42 contacts with the shifting lever 28 and serves to assist in bringing the latter to the central or neutral position. Similarly, surface 129' assists in shifting the gear shift lever 28 to the neutral position when lever 28 is shifted from the reverse position. The operation of the cross shift piston described in connection with the first neutral position thus serves to shift lever 28 to neutral position. It is also to be understood that the equalizing springs 47 and 48 are only of sufficient tension to return the pistons 34 and 36 to the neutral position shown in Fig. 3 when the various gears are not in driving engagement and when there is no suction being exerted upon the pistons. In lieu of employing pistons of the character illustrated, it will be understood that other air responsive means such as diaphragms may be employed.

Under normal driving conditions, the invention contemplates rendering the gear shifting and the controlling mechanism automatically responsive to the speed of the vehicle, and in the preferred embodiment illustrated this is accomplished by utilizing the speedometer shaft for the actuating of automatic mechanism for advancing the control valve disc 83 at different rates of speed. Referring to Fig. 1, the speedometer drive shaft is contained within a sheathing 130 and is driven by a gear 131, which in turn is driven by a worm 132 upon the main drive shaft. Referring to Figs. 1 and 9, the speedometer drive shaft 133 extends vertically and is journaled in the automatic mechanism housing 134 which may be affixed to the instrument board as shown in Fig. 1, and to which is also secured bracket 135 adapted to support the control valve 57. The speedometer shaft then continues to operate speedometer 136. Within the housing 134 the shaft 133 is preferably provided with a collar 137 for supporting the shaft in operative postition, and adjacent the upper portion of the shaft within the housing 134 there is keyed a transverse member 138, to the ends of which are pivoted a pair of governors having inwardly extending arms 139 and depending weighted portions 140. The inner extremities of the arms 139 preferably carry rollers which bear against the upper surface of slide 141 loosely mounted upon shaft 133.

Pivotally mounted adjacent one side of the housing 134 is an arm 142, the end of which is preferably bifurcated to provide portions 143, as shown in Fig. 6, having slotted extremities adapted to engage pins 144 projecting laterally from the slide 141. A vertically movable rod 145 is slidably mounted in the lower portion of the housing 134, as shown in Fig. 9, and has its upper end connected to arm 142 by means of link 146. The lower extremity of the rod 145 extending beyond the housing 134 carries a cam member 147 having an inclined cam surface portion 148, and also provided with an arm 149 which has a depending portion 150 and a laterally extending portion 151. Mounted upon the upper surface of disc 83 is a shoe 152 having a diagonally inclined surface 153 in its lower portion. In placing the mechanism in operative position for driving, the control lever 104 is shifted to the first speed position 112, shown in Fig. 1, and this serves to rotate disc 83 in a counter-clockwise direction to the position shown in Fig. 15, where shoe 152 is vertically beneath and adapted to be engaged by the inclined cam surface 148 of the cam 147. The clutch pedal 76 is then depressed, causing the operation of clutch air valve 66 to open air communication between pipes 65 and 78, and the gears are then automatically shifted into first speed position by means of the mechanism above described; and upon release of the clutch pedal and engagement of the clutch the vehicle proceeds forwardly.

As the speed of the vehicle increases, cam 147 is forced downwardly by reason of the fact that the weighted portions 140 are caused to swing outwardly under centrifugal force, which causes automatic turning of disc 83 to the second speed position shown in Fig. 17 when the speed has reached a predetermined point, for example, ten miles per hour as a changing point between first and second speeds. Any suitable speed selection may be adopted by proper formation and adjustment of the parts, and the same is true with respect to the change between second and third speeds.

When the second speed position of the disc 83 has been reached, it is desirable to arrest the movement of the disc to effectuate the shifting of the gears from first to second speed position, even though the speed of the vehicle may be in excess of the maximum second speed. The slide 141, as shown in Fig. 9, is normally spring held upwardly by means of compression spring 154 surrounding shaft 133 and interposed between slide 141 and collar 137, but when the second speed position explained has been reached, the travel of disc 83 is arrested by means of a detent 155, shown in detail in Fig. 11, which engages a notch 156 on the under surface of the disc 83. As illustrated, detent 155 is normally urged upwardly by spring 157, and the arrangement is such that the movement of disc 83 in a counter-clockwise direction is arrested, but movement of the disc 83 in a clockwise direction, and passage of notch 156 over detent 155, is permitted without any arresting operation.

The detent casing 158 is connected by pipe 159 to a detent operating valve 160, shown in detail in Fig. 5, and provided with an operating pin 161 which projects within cylinder 33 and is adapted to be shifted by the end of piston 34 when the latter approaches the limit of its movement toward the left from the position shown in Fig. 3. This operation serves to unseat the valve 162 carried upon pin 161, in such manner that when the suction is present in chamber 50 of cylinder 33, not only is the piston drawn to the left, but detent valve 160 is opened, withdrawing detent 155 and permitting continued movement of disc 83.

As shown in Fig. 5, the valve 162 is held in closed position by spring 163. Thus, even though a speed in excess of the normal second speed is reached, travel of disc 83 is not permitted beyond second speed position, and cam 147 is maintained in this position by engagement of shoe 152 holding slide 141 in the second speed vertical position against the downward pressure of arms 139. When the clutch pedal 76 is depressed after disc 83 has reached second speed position described, and valve 66 is opened by this operation, the gears are automatically shifted through the air suction described to second speed position, and release of the clutch pedal and consequent engagement of the clutch causes driving engagement of the driving gears in second speed position.

Assuming, however, that the speed of the vehicle has exceeded the normal second speed, depression of the clutch pedal 76 will not only cause shifting of the gears into second speed position, but if the clutch pedal is maintained in a depressed position for a relatively short interval of time, shifting of the gears from second speed position to third speed position will also be completed. This is accomplished by reason of the fact that when the shift into second speed position is made, piston 34 strikes against pin 161, causing the withdrawal of detent 155 and permitting the continued rotation of disc 83 to third speed position. Valve 66 being maintained in proper position to offer communication between pipes 65 and 78, the gears are then shifted into third speed position, and upon release of the clutch pedal 76 and consequent clutch engagement, the vehicle proceeds under power with the gears shifted into position for third speed.

After the vehicle is proceeding in third speed, the operator shifts control lever 104 to the second speed position 113, shown in Fig. 1, in order to bring arm 93 to a position for contact by stop 95 when a second speed has been reached as the speed of the vehicle decreases. Upon this decrease in speed, lateral portion 151 of arm 149, joined to the cam member 147, engages the inclined surface 153 of shoe 152, assisting in the clockwise or return rotation of disc 83 as the cam member 147 moves upwardly. It will be understood that this upward movement of cam 147 is accomplished by reason of the fact that the weighted members 140 descend under force of gravity as the centrifugal force decreases in accordance with the decrease in the vehicle speed.

When the speed of the vehicle has decreased to the maximum second speed, or a speed lower than the maximum second speed, shifting of the gears to second speed is accomplished by depression of the clutch pedal 76, as described in connection with the other shifting movements, and the driver may then adjust the control lever 104 to first speed or off position as desired, inasmuch as the vehicle may be brought to a stop from second speed if desired. It will be understood that adjustment of the control lever 104 to reverse position is not made unless the vehicle has been brought to a stop.

Manual rotation of disc 83 in a return or clockwise direction is accomplished by shifting control lever 104 toward the right from the position shown in Fig. 1 until arm 93 is brought in contact with stop 95. Thereupon control lever 104 is shifted in the opposite direction, causing rod 100 to be moved inwardly to engage the stop 95.

The preferred embodiment of the invention contemplates pneumatic operation employing air suction induced in the intake manifold of the internal combustion engine usually incorporated in a motor vehicle, although it is to be understood that should other pneumatic means be necessary or desirable for operating the mechanism, such alteration or adoption may be resorted to.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. Mechanism for operating the gear shift lever of a motor vehicle, comprising a longitudinally movable member arranged to engage and move said lever in a longitudinal direction, a transversely movable member arranged to engage and move said lever in a transverse direction, a longitudinally arranged cylinder, a piston slidable in said longitudinally arranged cylinder and connected to said longitudinally movable member, a a transversely arranged cylinder, a piston slidable in said transversely arranged cylinder and connected to said transversely movable member, pneumatic means operatively connected to said cylinders for causing actuation of said pistons, and means responsive to the speed of the vehicle for automatically placing said pneumatic means in operative relation for alteration of gear engagement for different speeds as the speed of the vehicle increases, said last named means comprising a centrifugally operable member operatively connected to the vehicle speedometer shaft.

2. Mechanism for operating the gear shift lever of a motor vehicle, comprising pneumatic means for shifting said lever to any required position for effecting gear engagement or disengagement, and means responsive to the speed of the vehicle for automatically placing said pneumatic means in operative relation for alteration of gear engagement for different speeds as the speed of the vehicle increases, said last named means comprising a centrifugally operable member operatively connected to the vehicle speedometer shaft.

3. Mechanism for operating the gear shift lever of a motor vehicle, comprising a longitudinally movable member arranged to engage and move said lever in a longitudinal direction, a transversely movable member arranged to engage and move said lever in a transverse direction, a longitudinally arranged cylinder, a piston slidable in said longitudinally arranged cylinder and connected to said longitudinally movable member, a transversely arranged cylinder, a piston slidable in said transversely arranged cylinder and connected to said transversely movable member, pneumatic means operatively connected to said cylinders for causing actuation of said pistons, means responsive to the speed of the vehicle for automatically placing said pneumatic means in operative relation for alteration of gear engagement for different speeds as the speed of the vehicle increases, said last named means comprising a centrifugally operable member operatively connected to the vehicle speedometer shaft, and means under the control of the vehicle clutch pedal for causing actuation of said pneumatic means.

4. Mechanism for operating the gear shift lever of a motor vehicle, comprising opposed cylinders, a longitudinal member having a piston in each of said opposed cylinders, a slotted portion carried by said longitudinal member and adapted to embrace said gear shift lever, a transversely arranged cylinder having therein a transversely movable member carrying a piston in said transversely arranged cylinder and having a portion for embracing said gear shift lever, and pneumatic means for actuating said pistons.

5. Mechanism for operating a gear shift lever of a motor vehicle comprising pneumatic means for shifting said lever to any required position for effecting gear engagement or disengagement, valve means for controlling the effective connection of said pneumatic means for accomplishing the shifting of said lever, speed responsive means for controlling said valve means, and a stop element operating in combination with said valve means to cause a shifting of said gear shift lever into second speed regardless of excess speed built up in first speed and also designed to maintain said valve means in said position regardless of the excess speed built up in second speed.

6. Mechanism for operating a gear shift lever of a motor vehicle comprising pneumatic means for shifting said lever to any required position for effecting gear engagement or disengagement, valve means for controlling the effective connection of said pneumatic means for accomplishing the shifting of said lever, speed responsive means for controlling said valve means, a stop element operating in combination with said valve means to cause a shifting of said gear shift lever into second speed regardless of excess speed built up in first speed and also designed to maintain said valve means in said position regardless of the excess speed built up in second speed, and release mechanism for releasing said stop after a shifting into second speed has been accomplished so that at greater speed said valve means will be in position to effect a connection of said pneumatic means for shifting said gear shift lever into third speed.

7. Mechanism for operating a gear shift lever of a motor vehicle comprising pneumatic means for shifting said lever to any required position for effecting gear engagement or disengagement, valve means for controlling the effective connection of said pneumatic means for accomplishing the shifting of said lever, speed responsive means, for controlling said valve means, a stop element operating in combination with said valve means to cause a shifting of said gear shift lever into second speed regardless of excess speed built up in first speed and also designed to maintain said valve means in said position regardless of the excess speed built up in second speed, and a manually operable member for effecting a change in position of said valve means at the desire of the driver.

HENRY P. BIRKEMEIER.